Patented May 27, 1941

2,243,489

UNITED STATES PATENT OFFICE 2,243,489

PROCESS OF MAKING AN ALUMINUM BONDING METAL

Frank B. Smith, Storm Lake, Iowa, assignor to Stolac Laboratories, Storm Lake, Iowa No Drawing. Application May 18, 1940, Serial No. 336,003

6 Claims. (Cl. 75—178)

The principal object of my invention is to provide an aluminum bonding metal which may be melted and used for joining or rebuilding aluminum and which when cooled possesses great strength and provides a rigid bond with the metal to which it comes in contact.

A further object of this invention is to provide an aluminum bonding metal having a melting point below that of aluminum, but which will, when once hardened, have a melting point equal to or greater than the metallic surface to which it has become attached.

A still further object of my invention is to provide an aluminum bonding metal which has the same resistance to oxidation as aluminum and which may be easily used without exceedingly high heat.

A still further object of my invention is to provide an aluminum bonding metal that is self-fluxing, thereby increasing the ease with which it may be applied to the seam desired to be bonded.

A still further object of this invention is to provide an aluminum bonding metal that is extremely economical in manufacture, easy to use, and one which possesses great inherent strength.

These and other objects will be apparent to those skilled in the art.

My invention consists in the method hereinafter set forth and pointed out in my claims.

It has always been difficult to solder or bind two pieces of aluminum together. This has generally been accomplished through a high heat welding process or by the use of various lead base solders which would adhere to the aluminum. These previous bonding materials have had many disadvantages. The welding process was difficult and required a skilled workman and a great amount of apparatus. The heat required in this particular function was so intense as to prevent the bonding of thin pieces of aluminum together and prevent the use of the metal for building over holes, punctures, and the like in thin sheet aluminum articles. Furthermore, this type of union was prone to corrode, thereby turning the junction point black. With the lead base types of solder, the joint was no more than an adhesion joint of no great tensile strength and was merely a make-shift method of causing one piece of aluminum to adhere to another. These soldering compounds naturally were much darker than the aluminum and did not resist corrosion. I have overcome such disadvantages as will be appreciated and as will be hereinafter more fully set forth.

In the composition of my bonding metal, I use as my base, for economic reasons, a copper bearing pot metal to which is added sulphur and aluminum. The sulphur need not be added unless great tensile strength is desired in the finished product and the addition of sulphur acts to harden the finished bonding metal. This entire composition is placed in a crucible and heated from below and above until the melting point is reached, at which time a catalytic agent is added, which causes the metals to combine. The molten metal is then run out into bars of suitable size and allowed to cool.

These small bars have all of the characteristic color of aluminum and have a decided metallic ring when struck together.

The finished product contains approximately 70% zinc, 20% aluminum, 8% copper, 1% nickel, and 1% tin, and melts at a lower temperature than does ordinary aluminum or somewhat below 500° C. An average proportion or composition of the pot metal used is found to contain approximately 13.6% aluminum, 2.8% copper, 3.9% tin, and 79.3% zinc. The tin content of the copper base pot metal varies considerably and it is better to have a percentage of tin well below this figure. The other .4 of 1% of the pot metal is composed of nickel and other extraneous metals depending upon the type of pot metal used. It is found, however, that the composition of pot metal can vary considerably and still give the desired results in the finished bonding metal. A representative example of the method involved is as follows:

A pot metal composition of approximately 1470 parts zinc, 420 parts aluminum, 168 parts of copper, 21 parts of nickel, and 21 parts of tin are placed in a crucible. Over this is sprinkled powdered or colloidal aluminum in the approximate proportion of 1% of the weight of the mass. If it is desired to have an extremely hard finished bonding bar, sulphur may be sprinkled over this mass in the amount of approximately 2% of the weight of the mass. The resultant mass is then heated from below the crucible and directly on the top of the mass, by force flame, until the melting point of the mass has been reached, at which time a catalytic agent is added consisting of acetylsalicylic acid and acetphenetidin. The proportions of these two agents to each other is approximately 7 to 5 respectively and the amount can be controlled as the surplus is vaporized, precipitated, and combined with the sulphur sludge formed on top of the molten mass. It is not exactly known the part played by the acetylsalicylic acid and acetphenetidin, but it is presumed, inasmuch as no compound or blending of metals takes place without these ingredients, that they act as a catalytic agent for promoting the combination of the metals one to the other. A decided sludge forms on the upper surface of the molten mass, presumably from the sulphur as this sludge is not noticeable when sulphur is not used and a precipitate is noted in the bottom of the crucible. This is composed of mainly lead and tin that is dropped when the metals go into union one with the other in the presence of the herebefore mentioned catalytic agents. The residue or sludge is skimmed from the surface of the molten material, and the material is then run into thin small bars either for use with welding mechanisms or to be used by the general public for the repair and joining together of aluminum material.

In use the bonding metal is self-fluxing and it is merely necessary to place the tip of the bonding metal adjacent the object to be bonded, permitting the flame of a torch or the like to heat both the bonding metal and the material to be bonded adjacent the point of contact between the bonding metal and the material to be bonded. When a heat has been reached where a slight sweating of the surface of the aluminum results, the bonding metal is then rubbed over this heated surface until it adheres, after which the bonding metal sweats into the metal and secures the bond. Such seams and welds have been found to possess greater strength than the body of the material and after it has cooled, the melting point seems to have risen above the melting point of the material to which it has been attached.

It is found that the initial melting point of the bonding melted bar is well below that of aluminum, but its final hardness is greater and its melting ponit higher than the aluminum, probably due to the molecular change in the bar after the application of the welding or bonding heat. The finished weld or bond has the same approximate brightness as the aluminum, does not readily corrode, and increases the strength of the metal at the particular point where the bond is made. It has been found that when two sheets of aluminum are bonded together with my bonding metal, the joint has greater strength than the aluminum sheets adjacent the joint and the bond is so strong between my metal and the aluminum that it cannot be forced apart.

Thus it will be seen that I have provided a method of making a bonding metal for bonding aluminum that is self-fluxing, possesses great inherent strength, has a low melting point, is easy to apply even by an unskilled workman and one which will not corrode or lose its strength in the course of time.

Undoubtedly other catalytic agents may be used in lieu of the acetylsalicylic acid and acetphenetidin, and these will hereinafter be referred to merely as a catalytic agent. The sulphur is unnecessary when fabricating certain types of the bonding metal.

My bonding metal may be used in conjunction with all types of metals and alloys, and is particularly adaptable to zinc base alloys, stainless steel, Monel and aluminum. All of these metals are extremely hard to join and although I have described my process for use on aluminum, it may be obviously used on all types of metals and alloys, thereof in the same manner as has been described for use on aluminum.

Some variations may be made in the component elements used in my process or method of producing an aluminum bonding metal without departing from the ultimate results obtained and it is my intention to cover in my claims any variations of proportions and composition which may be reasonably included within their scope.

I claim as my invention:

1. The process of making an aluminum bonding metal comprising, the taking of a copper base pot metal, comprising approximately 13.6% aluminum, 2.8% copper, 3.9% tin, 79.3% zinc, and .3% extraneous material the addition of approximately 1% of the weight of the mass of powdered aluminum to the base metals, the heating of the mass until the melting point is reached, the addition of a catalytic agent comprising acetylsalicylic acid and acetphenetidin in the approximate proportion of seven to five respectively to each other to the mass, and finally the drawing and cooling of the resultant combined metals into bars.

2. The process of making an aluminum bonding metal comprising, the taking of a copper base pot metal, comprising approximately 13.6% aluminum, 2.8% copper, 3.9% tin, 79.3% zinc, and .3% extraneous material the addition of approximately 1% of the weight of the mass of powdered aluminum to the base metals, the addition of powdered sulphur, the heating of the mass until the melting point is reached, the addition of a catalytic agent comprising acetylsalicylic acid and acetphenetidin in the approximate proportion of seven to five respectively to each other to the mass, and finally the drawing and cooling of the resultant combined metals into bars.

3. The process of producing an aluminum bonding metal comprising, the placing of a base metal mixture comprising, approximately 13.6% aluminum, 2.8% copper, 3.9% tin, 79.3% zinc, and .3% extraneous material, in a crucible, the addition of powdered aluminum in the amount of approximately 1% of the weight of the mass, the heating of the resultant mass to the melting point, the addition to the molten mass of a catalytic agent composed of acetylsalicylic acid and acetphenetidin in the approximate proportion of 7 to 5 respectively to each other, and lastly the drawing of the resultant metallic mixture into small bars and the cooling of the same.

4. The process of producing an aluminum bonding metal comprising, the placing of a base metal mixture comprising approximately 13.6% aluminum, 2.8% copper, 3.9% tin, 79.3% zinc, and .3% extraneous material in a crucible, the addition of powdered aluminum in the amount of approximately 1% of the weight of the mass, the addition of sulphur to the mass, the heating of the resultant mass to the melting point, the addition to the molten mass of a catalytic agent composed of acetylsalicylic acid and acetphenetidin in the approximate proportion of 7 to 5 respectively to each other, the skimming of the resulting sludge from the top of the molten metals, and lastly the drawing of the resultant metallic mixture into small bars and the cooling of the same.

5. In the process of producing an aluminum bonding metal comprising, the taking of approximately 1470 parts zinc, 420 parts aluminum, 168 parts of copper, 21 parts of nickel, and 21 parts of tin, and placing them in a crucible, the covering of this metal mixture with powdered aluminum in the approximate amount of 1% of the weight of the mass, the application of heat to the crucible, the application of heat to the top of the mass until the melting point of the mass is reached, the addition of a catalytic agent comprising acetylsalicylic acid and acetphenetidin in the approximate proportion of seven to five respectively to each other when the melting point of the mass is reached, and lastly the drawing of the metal into thin bars and the cooling of the bars.

6. The process of making an aluminum bonding metal comprising, the taking of a copper base pot metal, comprising approximately 13.6% aluminum, 2.8% copper, 3.9% tin, 79.3% zinc, and .3% extraneous material the addition of approximately 1% of the weight of the mass of powdered aluminum to the base metals, the heating of the mass from above and below until the melting point is reached, the addition of acetylsalicylic acid and acetphenetidin to the mass, and finally the drawing and cooling of the resultant combined metals into bars.

FRANK B. SMITH.